United States Patent [19]

Ishigaki et al.

[11] 4,240,653
[45] Dec. 23, 1980

[54] FLEXIBLE EXPANSION JOINT

[75] Inventors: Masahiro Ishigaki; Tadayoshi Ohira, both of Ibaraki; Kanji Fujita, Takarazuka; Shin-ichiro Nomura, Takatsuki, all of Japan

[73] Assignee: The Toyo Rubber Industry Co., Ltd., Osaka, Japan

[21] Appl. No.: 957,085

[22] Filed: Nov. 2, 1978

[30] Foreign Application Priority Data

Nov. 7, 1977 [JP] Japan .................................. 52/133868

[51] Int. Cl.² .............................................. F16L 21/00
[52] U.S. Cl. .................................................. 285/235
[58] Field of Search ....................... 285/235, 236, 229

[56] References Cited

U.S. PATENT DOCUMENTS

| | | | |
|---|---|---|---|
| 3,051,512 | 8/1962 | Cranston | 285/235 X |
| 3,087,745 | 4/1963 | Rumbell | 285/236 X |
| 3,206,228 | 9/1965 | Burrell | 285/235 X |
| 3,363,918 | 1/1968 | Fisher | 285/229 |
| 3,658,126 | 4/1972 | Bohlmann, Jr. et al. | 285/234 X |
| 4,023,834 | 5/1977 | Ewing et al. | 285/235 |

FOREIGN PATENT DOCUMENTS

| | | | |
|---|---|---|---|
| 851788 | 10/1952 | Fed. Rep. of Germany | 285/235 |
| 1253532 | 11/1967 | Fed. Rep. of Germany | 285/229 |
| 21629 | of 1907 | United Kingdom | 285/236 |

Primary Examiner—Thomas F. Callaghan
Attorney, Agent, or Firm—Blanchard, Flynn, Thiel, Boutell & Tanis

[57] ABSTRACT

Flexible expansion joints utilized for coupling conduit pipes or pipelines for conveyance, supply, service and drainage of service water, sewage, industrial water, etc. are provided, which comprise a tubular flexible body portion and two side joint portions. The tubular flexible body portion comprises bias cord reinforcement layer(s) provided circumferentially at a "cord angle" of 10° to 45°. Alternatively, it may further comprise circumferential cord reinforcement layer(s) circumferentially provided at a "cord angle" of 0° to 25° inside the bias cord reinforcement, and a plurality of coaxial rigid rings. The flexible expansion joints have good pliability, flexibility, vibration absorbing property, internal and external pressure resistance, durability, anti-deformation property and the like.

10 Claims, 10 Drawing Figures

FLEXIBLE EXPANSION JOINT

FIELD OF THE INVENTION

This invention relates to flexible expansion joints used for coupling pipelines or conduit pipes for conveyance, supply, service and drainage of service water, sewage, industrial water, irrigation water, etc..

PRIOR ART

The prior art flexible joint as shown in FIG. 1 consists of a pair of joint portions comprised of side pipes 1' and a tubular flexible body portion 2' comprised of a rubber member 4' joined to the side pipes 1' at the ends thereof. In the tubular body portion 2', in order to impart strength against internal and external pressures, a plurality of inner steel rings 6' and a plurality of outer steel rings 6'' are embedded circumferentially in the inner and outer sides of the rubber member 4', respectively, so as to be disposed axially alternately between the former and the latter.

Such flexible expansion joint is, however, liable to cause separation between the rubber member 4' having elasticity and the steel rings 6', 6'' having rigidity when it is repeatedly subjected to expansion and compression. Particularly, the rubber layer between the inner and outer steel rings is likely to degrade when it undergoes repeated displacements due to bending and flexing. In this way, the flexible expansion joint loses its strength and durability.

Further, in situations where such expansion joint is applied to coupling of conduit pipes installed under the ground, it is likely to be deflected by bending, flexing, shearing, torsion or like created owing to eccentricity caused between two coupled conduit pipes by reason of a displacement phenomenon of the ground, e.g. earthquakes or uneven subsidence. As a result, the rubber member 4' is deformed to two curved rubber parts, one being elongated with the larger curvature and the other compressed with the smaller curvature. Thus, a large tensile stress is generated by reason of the rubber part of the larger curvature being outwardly curved and such stress is exerted locally upon the joining part between the tubular body portion 2' and the side pipe 1'. Particularly where the tensile stress exerted upon the joining part is excessively large as compared with the adhesive force between dove-tail rib ring 3' provided adjacent to the side pipe 1' and the rubber member 4', separation occurs at the interfacial boundary between the dove-tail rib ring and the rubber member, and eventually, the joining part causes separation into the tubular flexible body portion 2' and the side pipe 1'.

In order to overcome the foregoing drawbacks, an attempt has been made to provide a flexible expansion joint in which a tubular flexible body portion is improved over the expansion joint described above by embedding circumferentially a woven fabric in the rubber layer between the inner and outer steel rings 6', 6''. However, the flexible expansion joint of this type is also unsatisfactory because even though it may alleviate to a certain degree as to the separation phenomenon of the steel rings 6', 6'' from the surrounding rubber member 4', the separation of the tubular body portion 2' from the side pipe 1' cannot be impeded so that this problem remains to be solved.

BACKGROUND OF THE INVENTION

In general, flexible expansion joints used for coupling conduit pipes for conveyance, supply, service and drainage of service water, sewage, industrial water and others are required to have good adaptability to displacements, e.g. compression, expansion, bending, shearing, torsion, etc., pliability, flexibility, vibration-absorbing property, internal and external pressure resistances and durability.

In view of the above required properties of joints, the present invention has as its object to provide flexible expansion joints of novel construction, by which it is possible to obtain satisfactory properties as enumerated above against any displacement phenomena such as expansion, compression, bending, flexing, shearing, torsion and the like and to assure firm bonding between the tubular flexible body portion and the side pipe for a long duration.

SUMMARY OF THE INVENTION

In accordance with one aspect of this invention, the aforesaid object is accomplished by a flexible expansion joint having an improved construction in the tubular flexible body portion in which at least one ply of bias cord reinforcement layer is embedded in a fully circumferential fashion in the rubber layer at a cord intersecting angle to the circumferential direction (hereinafter referred to as simply "cord angle") of 10° to 45° so as to be firmly secured to the stop rings adjacent to the side pipes at the ends thereof by such means as tight fastening.

According to another aspect of this invention, a flexible expansion joint is provided in which the tubular flexible body portion further comprises at least one ply of circumferential cord reinforcement layer provided in a fully circumferential fashion inside the bias cord reinforcement layer at a "cord angle" of 0° to 25° and a plurality of rigid rings coaxially provided outside the bias cord layer or inside the circumferential cord layer.

The term "one ply" as used herein for the ply number of the bias cord reinforcement layer, in the art, means a pair of two bias cords in which one cord and the other cord are superimposed together at mutually opposite bias angles. On the other hand, the term "one ply" as used herein for the ply number of the circumferential cord reinforcement layer means literally only one ply cord.

BRIEF DESCRIPTION OF THE DRAWINGS

FIG. 4 to FIG. 6 each is an axial sectional view showing another embodiment of flexible expansion joint according to this invention in which the reference numeral 6 designates rigid rings. FIG. 6 is an enlarged fragmentary view showing the essential part of FIG. 5.

More particularly, FIG. 7 shows a structure in which a plurality of rigid rings 6 are disposed in the outer rubber layer 4 and one ply of bias cord reinforcement layer 7 having a "cord angle" of 10° to 45° is embedded in the axially full length between the stop rings with the ends thereof wound around and turned up over the bead rings 8.

FIG. 8 shows a modification of FIG. 7 in which the bias cord reinforcement layer is disconnected in the axial direction to constitutes a pair of side layers, 7, 7 at the side areas thereof.

FIG. 9 shows a structure in which a ply of circumferential cord reinforcement layer 5 substantially parallel with the circumferential direction is embedded inside the bias cord reinforcement layer 7 as shown in FIG. 7 so as to adjoin to the stop rings 3 at the ends thereof.

FIG. 10 shows a structure in which one ply of circumferential cord reinforcement layer 5 substantially parallel with the circumferential direction is embedded inside the two side bias cord reinforcement layers 7, 7 as shown in FIG. 8, and corresponds to the embodiment of FIG. 4.

Like parts are designated by like reference numerals throughout FIG. 2 to FIG. 10.

DETAILED DESCRIPTION OF THE INVENTION

The invention will be hereinafter described in greater detail with reference to the accompanying drawings.

Figure 1:
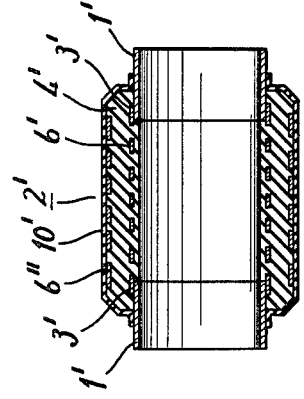
FIG. 1 is an axial sectional view of a conventional flexible expansion joint in which the reference numeral 1' designates side pipes, 2' tubular flexible body portion, 3' dove-tail rib rings, 4' rubber member, 6', 6'' steel rings, and 10' covering rubber sheet, respectively.
Figure 2:
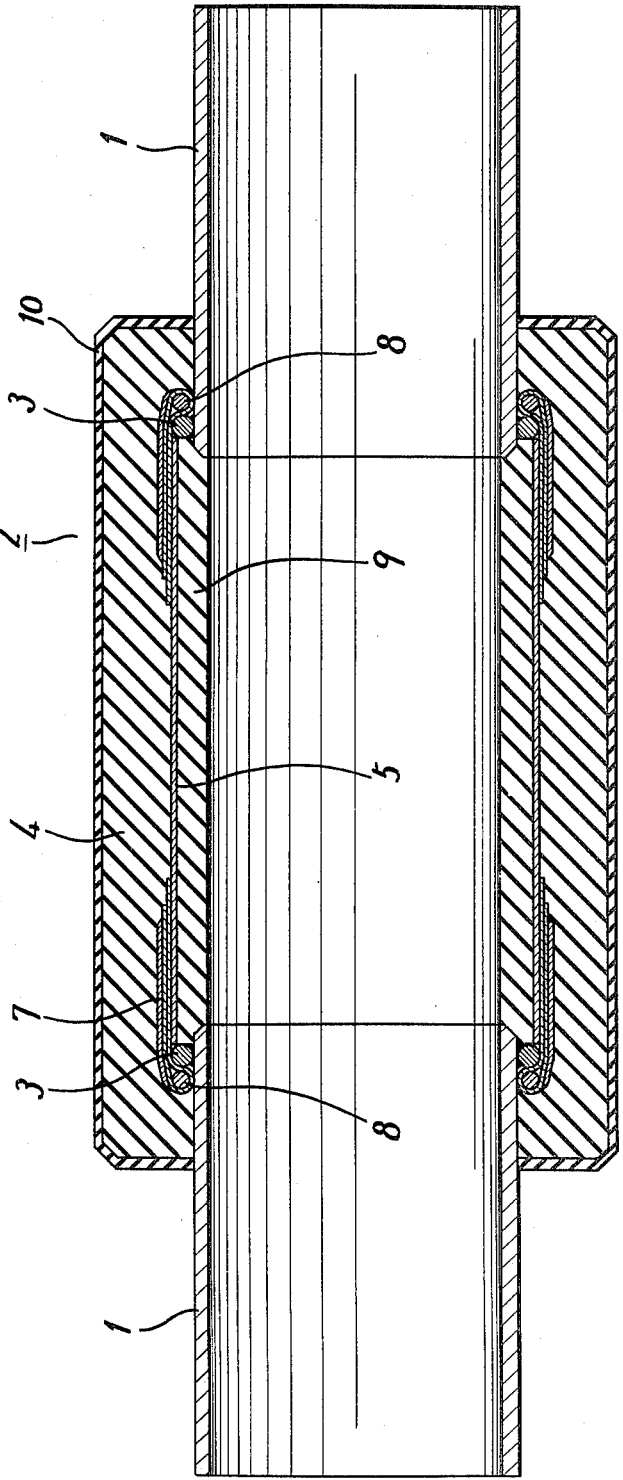
FIG. 2 and FIG. 3 each is an axial sectional view showing an embodiment of flexible expansion joint according to this invention, in which the reference numeral 1 designates side pipes, 2 tubular flexible body portion, 3 stop rings circumferentially provided at the side pipes at the joining parts of the tubular body, 4 outer rubber layer, 5 circumferential cord reinforcement layer, 7 bias cord reinforcement layer, 8 bead rings, 9 inner rubber layer, 10 covering rubber sheet, and 11 annular grooves, respectively.

Now referring to FIG. 2, the flexible expansion joint comprises mainly a pair of side pipes 1 constituting joint portions and the tubular flexible body portion 2 joining the side pipes 1 at the sides thereof. At the joining parts the stop rings 3 are fixed circumferentially to the side pipes by welding or any bonding means so as to form ribs protruding radially on the circumferential surfaces of the side pipes 1. The tubular flexible body portion 2 comprises the outer rubber layer 4, the inner rubber layer 9 and the covering rubber sheet 10. Between the inner and outer rubber layers there are provided one ply bias cord reinforcement layers 7, which are disconnected in the axially intermediate area between the stop rings whereby to constitute a pair of side layers, 7, 7. The side layers 7, 7 are disposed in a fully circumferential fashion outside the circumferential cord reinforcement layer 5 with the ends thereof secured physically to the stop rings 3. The ends of said side layers 7, 7 each is wound around and turned up over the bead ring 8 such as the bead wire adjacent to the stop ring 3, to lap over the bead ring and the stop ring and is further tightly fastened with metal wire at the lapped part.

In the construction of FIG. 2, the flexible expansion joint having only the bias cord reinforcement layer 7 provided (without the circumferential cord layer 5) can also attain the intended object of this invention.

The terms, "inner rubber layer" and "outer rubber layer" herein referred to are defined, respectively, by radially internal and external circumferential layers of the tubular body 2 relative to the reinforcement layers 5 and 7.

Figure 3:
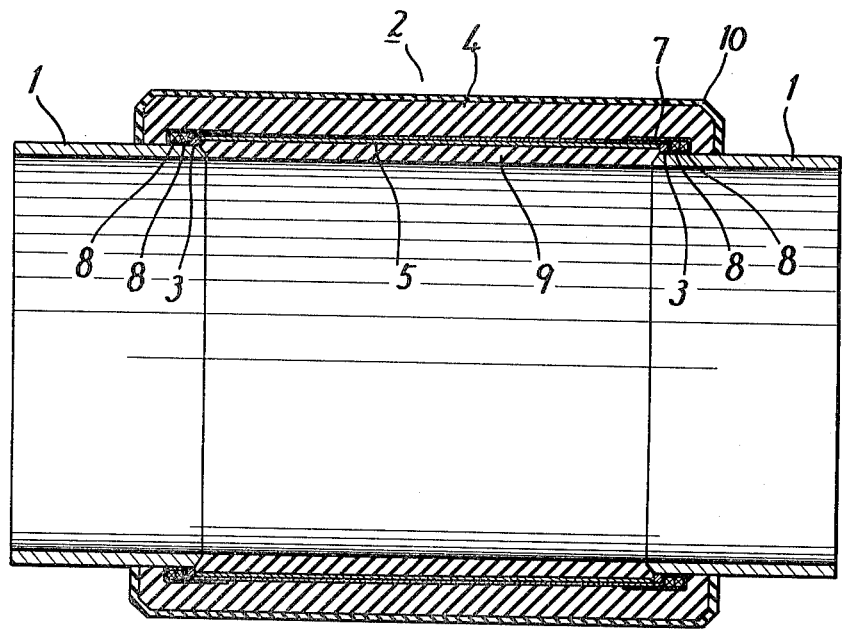

The construction shown in FIG. 3 shows another embodiment of this invention. In that figure, one ply of the bias cord reinforcement layer 7 extending continuously between the stop rings 3 is disposed in a fully circumferential fashion outside one ply of the circumferential cord reinforcement layer 5 between the inner and outer rubber layers 9, 4 with the ends thereof secured firmly to the stop rings in a similar manner to the case of FIG. 2.

The flexible expansion joints having the constructions as described so far in FIG. 2 and FIG. 3 are useful for pipes on which a low external pressure is exerted.

FIG. 4 shows a further embodiment of this invention. Referring to that figure, in the tubular body portion 2, a plurality of rigid rings 6 having mutually substantially the same diameters are embedded coaxially with a suitable pitch in the outer rubber layer 4. One ply of the bias cord reinforcement layer 7 is embedded in a fully circumferential fashion between the inner and outer rubber layers with the ends thereof secured physically to the stop rings 3, the layer being disconnected in the axial intermediate area between the stop rings to constitute one pair of the side layers 7, 7 at the side areas. One ply of the circumferential cord reinforcement layer 5 is disposed extending between the stop rings with the ends thereof adjoined to the stop rings. The ends of the bias cord reinforcement layer 7 are fastened tightly to the stop rings in a similar manner to that described above.

The modification of this embodiment where the rigid rings are provided coaxially in the inner rubber layer may be included in the scope of this invention.

Figure 5:
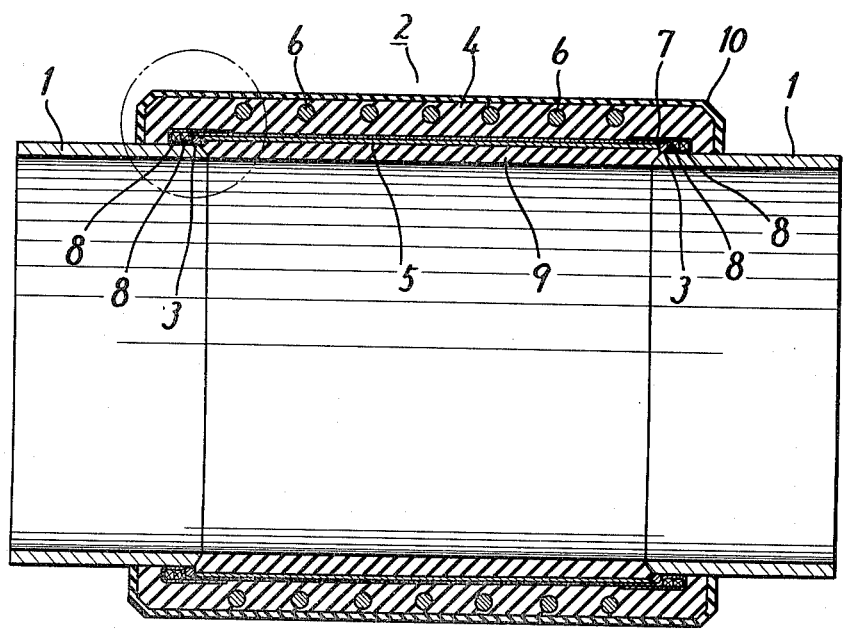
Figure 6:
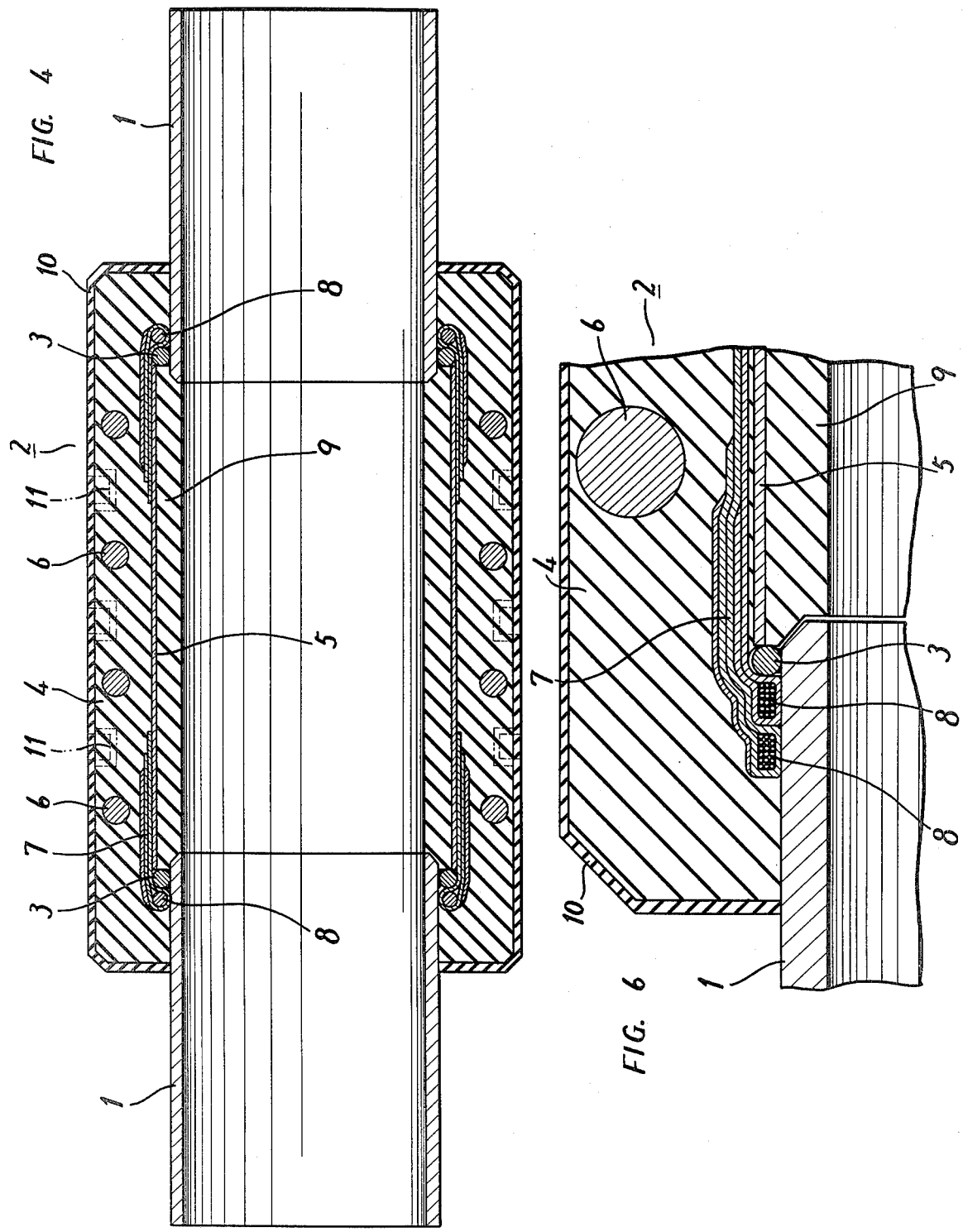
Figure 7:
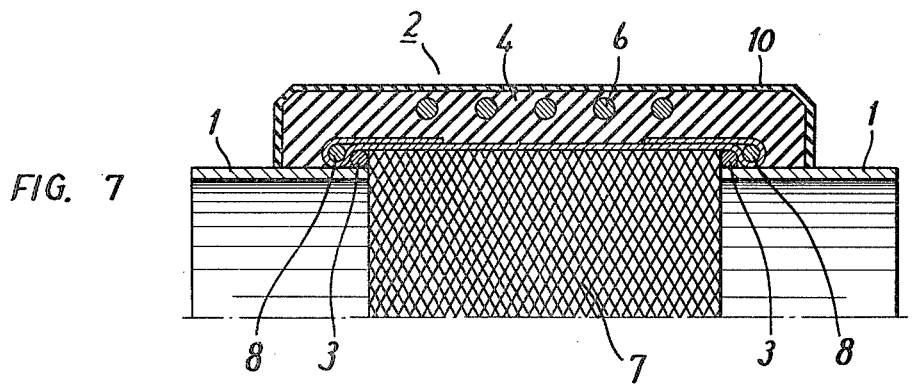
FIG. 7 to FIG. 10 each is a schematic view showing an example of structure of the reinforcement layer(s) embedded in the tubular body portion 2 of the flexible expansion joint according to this invention with the turnup part at the stop ring not shown.
Figure 8:
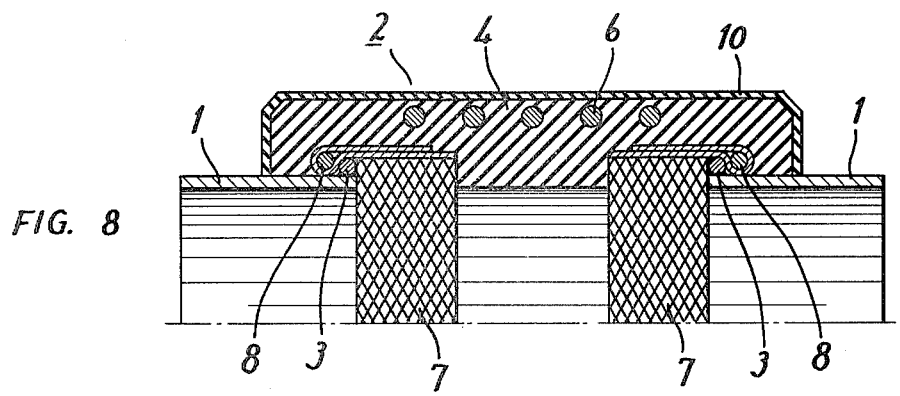
Figure 9:
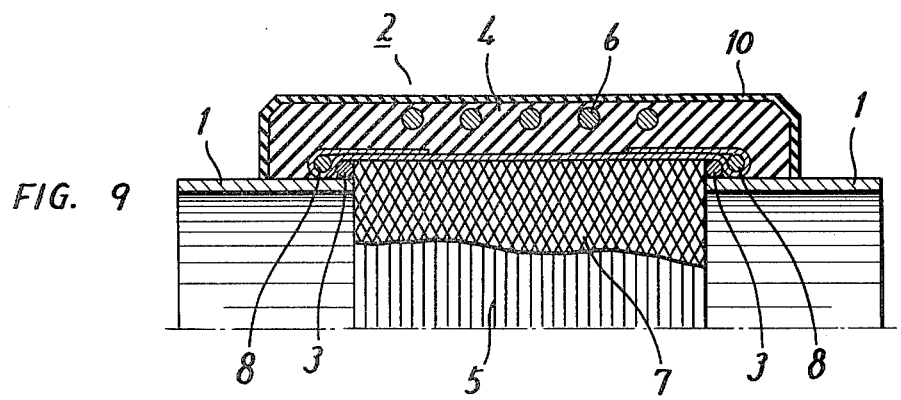
Figure 10:
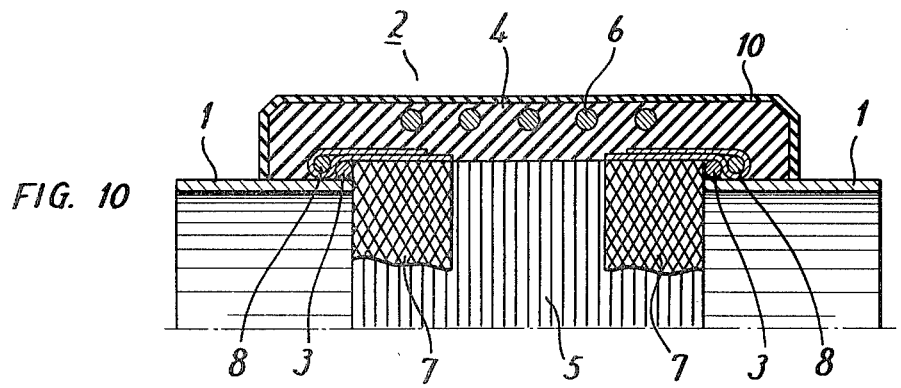

FIG. 5 is concerned with a still further embodiment, which is a modification of the embodiment of FIG. 4, and which shows the construction of a flexible expansion joint suited for pipes of large caliber. That is, two plies of the bias cord reinforcement layers 7 are disposed in a fully circumferential fashion and in the axially full length between the stop rings 3 outside the circumferential cord reinforcement layer 5 with the ends thereof secured firmly to the respective stop rings 3. The end parts are fastened in a similar manner to the embodiments described above except that two pairs of the bead rings 8 are provided instead of one pair of the bead rings.

According to this invention, the tubular flexible body portion 2 is thus based on a rubber layer of a suitable thickness comprising the outer rubber layer 4 and an inner rubber layer 9, and if desired, the covering rubber sheet 10 may further be provided. As a suitable rubber material for the rubber members 4, 9, 10, there may be employed any natural or synthetic rubber, provided that it has a JIS (Japanese Industrial Standards) hardness of 40° to 80°. Particularly preferred are rubber compounds having good weathering resistance and durability. For instance, combination of natural rubber or chlorinated rubber for the inner and outer rubber layers and chlorinated rubber for the rubber covering sheet may be exemplified as such.

In accordance with this invention, as a reinforcement member, at least one ply of the bias cord reinforcement layer is provided solely or in combination with at least one ply of the circumferential cord reinforcement layer as described above. In either case, the reinforcement member 5 or 7 is embedded between the inner and outer rubber layers 9, 4 and the bias cord reinforcement layer is provided outside the circumferential cord reinforcement layer.

The reinforcement member 5 or 7 is in the form of a sheet-like lamina in which the cord fabric is rubberized. As a circumferential cord reinforcement fabric there may be used those made of stretchable synthetic fibers, e.g. polyester, polyamide or inorganic fibers, e.g. steel. As a bias cord reinforcement material there may be used stretchable synthetic fibers.

In this invention, one ply of the bias cord reinforcement layer 7 comprises a pair of two bias cords having each a "cord angle" of 10° to 45° which are superposed together in opposite directions. In the rubber layer of the tubular body portion 2, the bias cord reinforcement layer 7 may be provided to extend in a fully circumferential fashion and in the axially full length between the stop rings. Alternatively, the bias cord reinforcement may be so provided that it may extend in a fully circumferential fashion, but it may not extend the axially full length between the stop rings. Rather it can be located in the side areas near the stop rings, and be disconnected in the axially intermediate area between the stop rings.

The end parts of the bias cord layer 7 may be secured to the stop rings 3 in the following way. The two terminal parts of the bias cord reinforcement with a length allowed for lapping are each extended to cover the stop ring 3 and then turned up round the bead ring 8 to lap over the bead ring and stop ring. The part thus turned up and lapped may be fastened tightly with a synthetic fiber thread or steel wire, or firmly bonded integrally with an adhesive. The number of bead rings 8 at each end may be appropriately chosen depending upon the caliber of the pipes or the internal and external pressures. One pair of the opposed bead rings 8 may be turned up with at least one ply of the bias cord reinforcement 7.

The circumferential cord reinforcement layer 5 is provided to extend fully circumferentially and axially between both the stop rings 3 and to be disposed at a "cord angle" of 0° to 25° or more preferably, substantially in parallel with the circumferential direction.

Several examples concerning the arrangement of the bias cord reinforcement layer and the circumferential cord reinforcement layer in the rubber layer are as illustrated in FIG. 7 to FIG. 10.

A plurality of the rigid rings 6 may be provided coaxially at suitable intervals in the outer rubber layer or the inner rubber layer, or both depending upon the extents of internal and external pressure resistances required of the flexible expansion joint. As for the stop ring, a conventional dove-tail rib ring, spherical ring or any other ring may be used.

The bias cord reinforcement layer 7 or the circumferential cord reinforcement 5 is, upon vulcanization molding, embedded in the unvulcanized rubber layer for the tubular body portion 2 to form a vulcanized rubber integrally united. The rigid rings 6, stop rings 3 and side pipes 1 may be preliminarily treated with an adhesive by a conventional procedure and then vulcanized and molded with the unvulcanized rubber. Thus, integral uniting or bonding of the metal parts and the surrounding or contacted rubber can be attained.

The outer circumferential surface of the tubular flexible body portion 2 may be formed circumferentially with annular grooves 11 at suitable intervals. In the embodiment where the rigid rings 6 are embedded, the grooves are preferably provided so that the grooves and the rigid rings may be located alternately in the axial direction.

The flexible expansion joints having diverse constructions as described above with which this invention is concerned may be utilized for various applications depending upon the required internal and external pressure resistances. For example, these may be applicable to water service pipelines to be buried under the ground or to pipes of various calibers to be installed at piers.

In accordance with this invention, the flexible expansion joints having diverse constructions described above have the performances and advantages that follow.

The joints have good internal and external pressure resistances because of the provision of the bias cord reinforcement having the specified "cord angle," and besides, since the rigid rings or circumferential cord reinforcement contribute further to the pressure resistance, they are free from any deformation due to elongation, compression or others and thus can maintain securely the initial shape for a long duration.

Further, the joints have good adaptability to displacements such as expansion, bending or others owing to the elasticity and pliability of the rubber member. Even though the tubular body portion is caused to elongate or bend where large-caliber-sized pipes coupled with the joint move or deflect in the departure direction, it can readily follow the movement. Thus, the full functions as a joint can be exhibited.

Moreover, the circumferential cord reinforcement serves effectively against the break-down due to external and internal pressures, whereas the bias cord reinforcement serves to control the rubber layer against excessive elongation in the axial direction to prevent the joint from degrading and deforming.

Since the end parts of the bias cord reinforcement having flexibility are firmly secured to the stop rings, the joining parts of the tubular flexible body portion and the side pipes, on which parts the largest stress is exerted when the tubular body portion is subjected to elongation, bending or other stress actions, have a great bonding strength. Accordingly, there is no danger of separation between the side pipes and the tubular flexible body portion.

The grooves formed on the surface of the tubular flexible body portion serve to improve the flexibility or pliability of that portion and to absorb elastic displacements due to compression, bending or flexing. Thus, the grooves assist in preventing degradation of the rubber layer and further separation of the stop rings from the surrounding rubber layer at the interfacial boundary.

The cooperation of the rigid rings and the circumferential cord reinforcement serves also to prevent the rigid rings from separating from the surrounding rubber layer.

What we claim is:

1. A flexible expansion joint, comprising: a pair of coaxial pipes defining joint portions, the adjacent ends of said pipes being axially spaced-apart from one another; an annular, circumferentially extending, stop ring secured to the outer surface of each of said pipes at a location close to said adjacent end thereof so as to protrude radially from said pipe around the circumference thereof; a tubular, flexible body coaxial with said pipes and having its opposite axial end portions sleeved on the outer surfaces of the adjacent ends of said pipes and extending axially outwardly beyond said stop rings, said body being affixed to said pipes and defining an internal, cylindrical, circumferentially closed zone between the adjacent ends of said pipes, said body having at least one annular, coaxial ply of bias cord reinforcement and at least one annular, coaxial ply of circumferential cord reinforcement disposed radially inside of said ply of bias cord reinforcement, said ply of bias cord reinforcement comprising two superposed bias cord lamina the cords of which extend at mutually opposite bias angles which bias angles are in the range of from 10° to 45° relative to the circumferential direction of said body, the opposite axial ends of said ply of bias cord reinforcement being affixed to said stop rings so that said ply of bias cord reinforcement extends axially between said stop rings, said ply of circumferential cord reinforcement comprising one ply cord which extends at an angle in the range of from 0° to 25° relative to the circumferential direction of said body, said ply of circumferential cord reinforcement extending axially between said stop rings, said tubular flexible body including an inner annular rubber layer located inside said ply of circumferential cord reinforcement and an outer annular rubber layer surrounding said ply of bias cord reinforcement, said inner and outer rubber layers being united by vulcanizing to form an integral tubular flexible body in which said ply of circumferential cord reinforcement and said ply of bias cord reinforcement are embedded between said inner and outer rubber layers.

2. A flexible expansion joint as claimed in claim 1 wherein said tubular, flexible body comprises a plurality of rigid rings embedded in at least one of said outer annular rubber layer and said inner annular rubber layer, said rings being coaxial, having substantially the same diameters and being spaced-apart from each other in a direction axially of said tubular flexible body.

3. A flexible expansion joint as claimed in claim 1 or claim 2 including a rubber cover sheet covering the entire surface of said outer rubber layer.

4. A flexible expansion joint as claimed in claim 1 or claim 2 wherein the outer surface of said outer rubber layer has a plurality of annular, axially spaced-apart, circumferentially extending grooves formed therein.

5. A flexible expansion joint as claimed in claim 1 or claim 2 wherein said tubular, flexible body has at least one annular, circumferentially extending, bead ring embedded therein in each of the axial end portions thereof, each of said bead rings being disposed adjacent to and axially outwardly of the stop ring on the associated pipe; each of said bead rings being of substantially the same diameter as its associated stop ring so as to protrude radially outwardly from the outer surface of its associated pipe, the respective axial end portions of said ply of bias cord reinforcement extending between the adjacent bead ring and stop ring and thence being bent around said bead ring and then extended axially inwardly so as to lap over said bead ring and stop ring.

6. A flexible expansion joint, comprising: a pair of coaxial pipes defining joint portions, the adjacent ends of said pipes being axially spaced-apart from one another; an annular, circumferentially extending, stop ring secured to the outer surface of each of said pipes at a location close to said adjacent end thereof so as to protrude radially from said pipe around the circumference thereof; a tubular, flexible body coaxial with said pipes and having its opposite axial end portions sleeved on the outer surfaces of the adjacent ends of said pipes and extending axially outwardly beyond said stop rings, said body being affixed to said pipes and defining an internal, cylindrical, circumferentially closed zone between the adjacent ends of said pipes, said body having a pair of annular, coaxial, side reinforcement layers, each of said side reinforcement layers extending axially from one stop ring partway toward the other stop ring whereby the adjacent axially inner ends of said side reinforcement layers are axially spaced from each other, each of said side reinforcement layers comprising at least one annular ply of bias cord reinforcement, said body having at least one annular coaxial ply of circumferential cord reinforcement disposed radially inside of said side reinforcement layers, said ply of bias cord reinforcement comprising two superposed bias cord lamina the cords of which extend at mutually opposite bias angles which bias angles are in the range of from 10° to 45° relative to the circumferential direction of said body, the outer axial end of said ply of bias cord reinforcement being affixed to the adjacent stop ring, said ply of circumferential cord reinforcement comprising one ply cord which extends at an angle in the range of from 0° to 25° relative to the circumferential direction of said body, said ply of circumferential cord reinforcement extending axially between said stop rings, said tubular flexible body including an inner annular rubber layer located inside said ply of circumferential cord reinforcement and an outer annular rubber layer surrounding said side reinforcement layers, said inner and outer rubber layers being united by vulcanizing to form an integral tubular flexible body in which said ply of circumferential cord reinforcement and said side reinforcement layers are embedded between said inner and outer rubber layers.

7. A flexible expansion joint as claimed in claim 6 wherein said tubular, flexible body comprises a plurality of rigid rings embedded in at least one of said outer annular rubber layer and said inner annular rubber layer, said rings being coaxial, having substantially the same diameters and being spaced-apart from each other in a direction axially of said tubular flexible body.

8. A flexible expansion joint as claimed in claim 6 or claim 7 including a rubber cover sheet covering the entire surface of said outer rubber layer.

9. A flexible expansion joint as claimed in claim 6 or claim 7 wherein the outer surface of said outer rubber layer has a plurality of annular, axially spaced-apart, circumferentially extending grooves formed therein.

10. A flexible expansion joint as claimed in claim 6 or claim 7 wherein said tubular, flexible body has at least one annular, circumferentially extending, bead ring embedded therein in each of the axial end portions thereof, each of said bead rings being disposed adjacent to and axially outwardly of the stop ring on the associated pipe; each of said bead rings being of substantially the same diameter as its associated stop ring so as to protrude radially outwardly from the outer surface of its associated pipe, the respective axial end portions of said side reinforcement layers extending between the adjacent bead ring and stop ring and thence being bent around said bead ring and then extended axially inwardly so as to lap over said bead ring and stop ring.

* * * * *